United States Patent [19]

Lobeck et al.

[11] 4,056,293
[45] Nov. 1, 1977

[54] SEGMENTED RETAINERS

[75] Inventors: John Hillman Lobeck; Raymond Harold Lindgren, both of South Bend, Ind.

[73] Assignee: The Torrington Company, Torrington, Conn.

[21] Appl. No.: 678,675

[22] Filed: Apr. 20, 1976

[51] Int. Cl.² ............................................. F16C 33/46
[52] U.S. Cl. ................................................. 308/217
[58] Field of Search ............... 308/201, 217, 218, 216, 308/235; 29/148.4 C

[56] References Cited

U.S. PATENT DOCUMENTS

| 3,365,255 | 1/1968 | Altson | 308/217 |
|---|---|---|---|
| 3,537,766 | 11/1970 | Scheifele | 308/217 |
| 3,628,839 | 12/1971 | Vanwest | 308/217 |
| 3,944,307 | 3/1976 | Bingle | 308/217 |

Primary Examiner—Joseph F. Peters, Jr.
Assistant Examiner—Gene A. Church
Attorney, Agent, or Firm—Diller, Brown, Ramik & Wight

[57] ABSTRACT

This disclosure relates to a segmented retainer for rollers of a roller bearing. The retainer includes a pair of end rings having circumferentially spaced separator bars extending therebetween. The separator bars are fixedly secured to the end rings against displacement and rotation. Each separator bar has a configuration wherein at each side thereof there are two radially spaced bearing surfaces separated by a lubricant pocket. The convex shape of the bearing surfaces, in conjunction with the convex rolling surfaces of associated rollers provide for suitable lubricant pockets and lubricant flow thereby providing adequate lubrication between the roller and the separator bars. The bars are secured to the end rings by a plurality of different means including welding and interfitting mechanical interlocks. Primarily, each bar is provided at each end thereof with a projection which is of a stepped configuration wherein the interlock between each bar and each side ring is of a greater than normal radial extent thereby preventing twisting or rotation of the bar with respect to its associated side rings.

20 Claims, 17 Drawing Figures

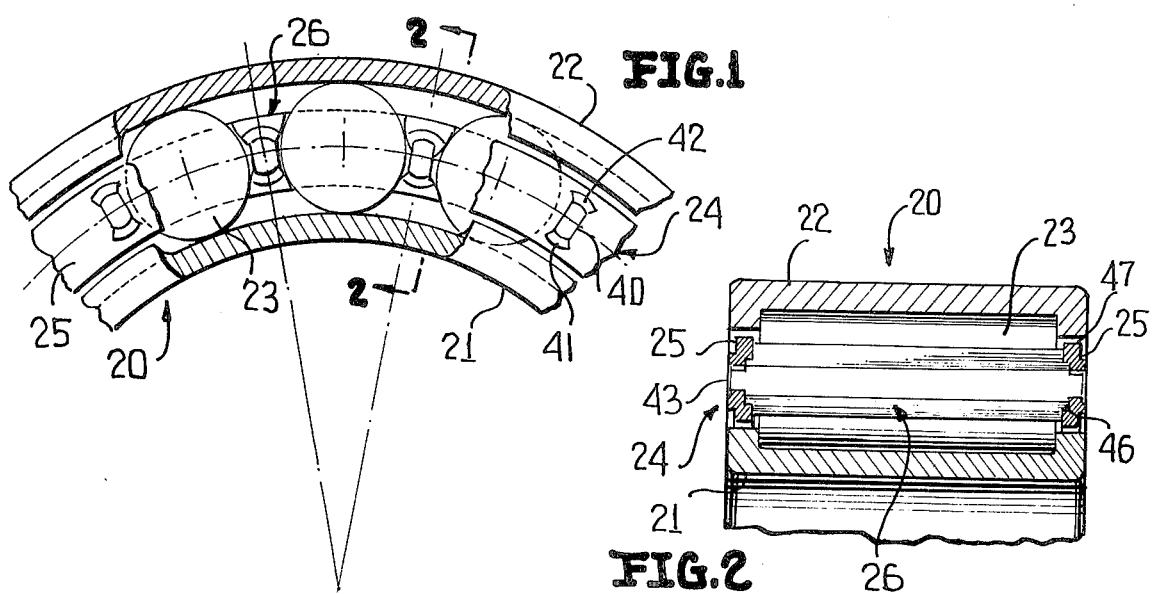
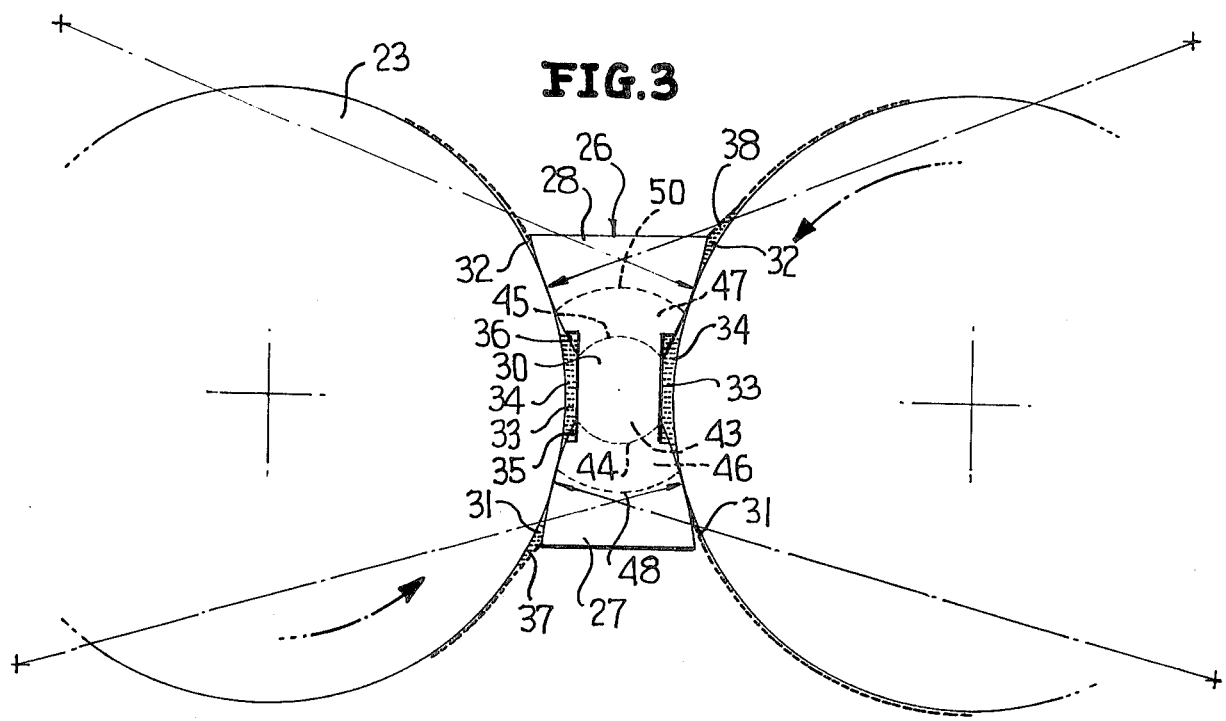
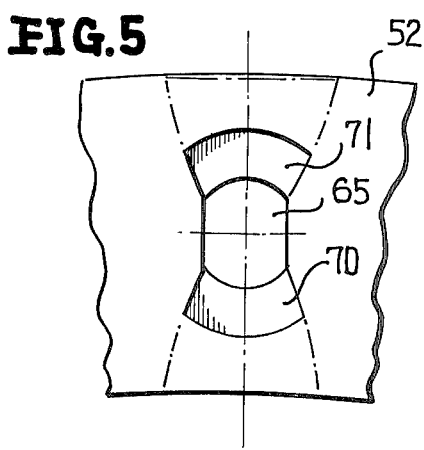
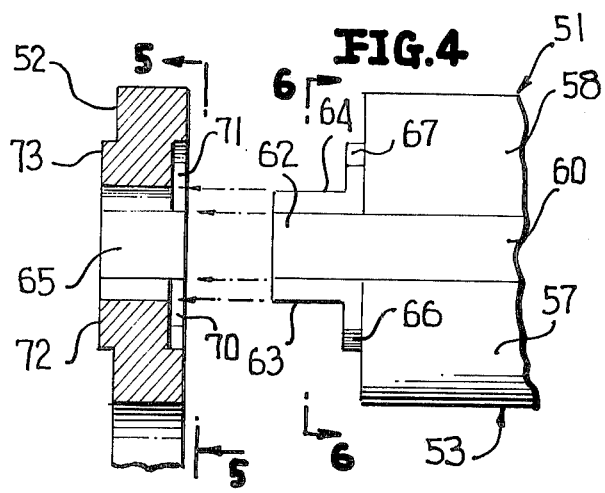

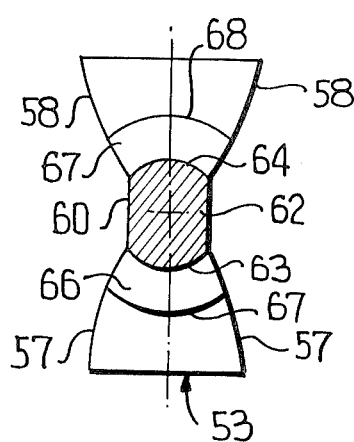
FIG.6
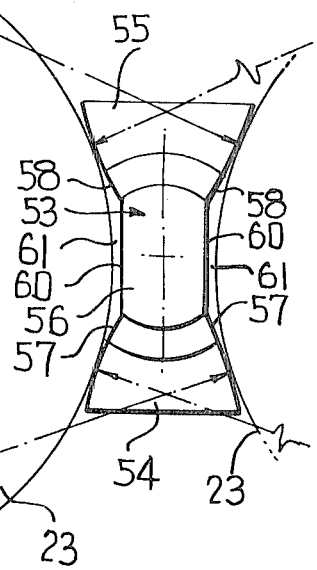
FIG.7
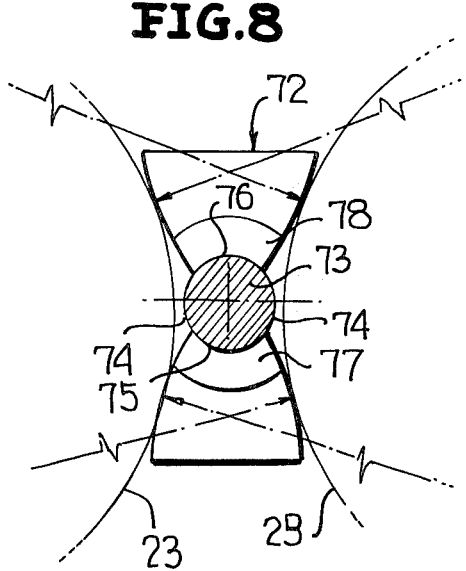
FIG.8
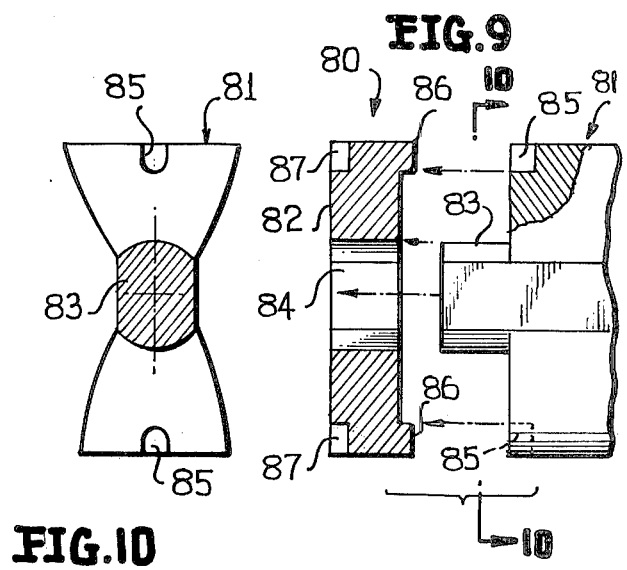
FIG.9
FIG.10

SEGMENTED RETAINERS

This invention relates in general to new and useful improvements in roller bearings, and more particularly to segmented retainers for roller bearings.

Segmented retainers are known. Such retainers include side end or rings and separator bars. The connection between the bars, however, are restricted to relatively small cross sectional projections on the bars extending through mating openings in the side rings. The mechanical connections between the bars and the side rings are such so as not to fully restrain against forces on the bars which would tend to rotate them about their axes.

In accordance with this invention, it is proposed to provide connections between the separator bars and side rings which are much stronger than those which were possible in the past. The connections may be in the form of special welds or in the form of special mechanical interlocks.

It is also another feature of this invention to provide a novel separator bar configuration which will provide for better lubrication of the mating surfaces of the bars and adjacent rollers. A principal feature of the improved bar construction is that the bearing surfaces thereof, that is the surfaces which engage the rollers, are of a convex configuration.

With the above and other objects in view that will hereinafter appear, the nature of the invention will be more clearly understood by reference to the following detailed description, the apended claims and the several views illustrated in the accompanying drawing.

In the drawings:

FIG. 1 is a fragmentary end view with parts broken away and showing a section of a roller bearing having incorporated therein a segmented retainer formed in accordance with this invention.

FIG. 2 is a fragmentary sectional view taken along the line 2—2 of FIG. 1 and shows further details of the retainer.

FIG. 3 is an enlarged schematic view showing specifically the configuration of a separator bar and the relationship thereof to a pair of adjacent rollers.

FIG. 4 is an enlarged exploded view of a modified separator bar and side ring with the side ring being shown in section and shows the connection therebetween.

FIG. 5 is a fragmentary elevational view of the side ring taken generally along the line 5—5 of FIG. 4.

FIG. 6 is a sectional view taken along the line 6—6 of FIG. 4 and shows further the details of the separator bar.

FIG. 7 is a schematic view showing the constructional details of the separator bar and the relationship thereof with respect to two adjacent rollers.

FIG. 8 is a view similar to FIG. 7 but showing a modified form of separator bar.

FIG. 9 is an exploded fragmentary view with parts shown in section of still another form of separator bar and side ring relationship.

FIG. 10 is a sectional view taken along the line 10—10 of FIG. 9 shows specifically the constructional details of the separator bar.

Figure 11:
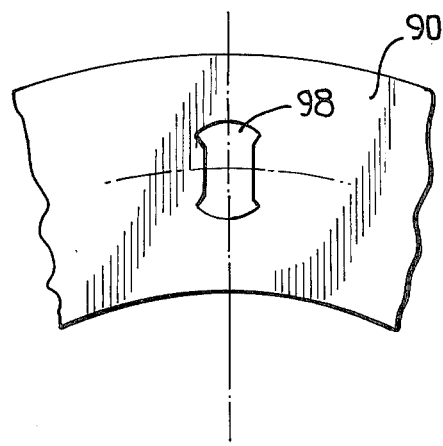
FIG. 11 is a framentary elevational view of a side ring having a thru hole therein particularly adapted to receive a modified form of separator bar.

Referring now to the drawings in detail, it will be seen that there is illustrated in FIGS. 1-3 a roller bearing construction embodying a segmented retainer of this invention. The roller bearing is generally identified by the numeral 20 and includes an inner race member 21, an outer race member 22 and a complement of rollers 23 disposed between the race members. The rollers 23 are retained in spaced relation with respect to one another by means of a segmented retainer, generally identified by the numeral 24.

The segmented retainer 24 includes a pair of end or side rings 25 between which a plurality of circumferentially spaced separator bars 26 extend. The separator bars 26 are mechanically interlocked with the side rings 25 in a manner to be described in detail hereinafter.

Referring now to FIG. 3, it will be seen that the separator bar 26 is of a cross section so as to include enlarged inner and outer portions 26, 27 separated by a reduced cross section central portion 30. At each side of the bar 26 there is an inner bearing surface 31, an outer bearing surface 32 and a lubricant pocket 33 separating the two bearing surfaces 31, 32. Each of the bearing surfaces 31, 32 is convex and preferably of a radius greater than the diameter of the associated rollers 23. The central portion 30 has the opposite sides thereof defined by flats 34 which, in turn, form a major wall of each lubricant pocket 33. The bearing surfaces 31, 32 do not intersect the flats 34, but terminate at inner and outer shoulders 35, 36 which, in combination with an associated flat, define each lubricant pocket 33.

As will be apparent from FIG. 3, adjacent portions of adjacent roller 23 rotate in opposite directions with the result that the left hand roller 23 rotates in a counterclockwise direction and forms between it and the adjacent bearing surface 31 a lubricant pocket 37 which assures lubricant between the left hand roller 23 and the left hand bearing surface 31 at all times. There is, of course, lubricant flow from the lubricant pocket 37 into the left hand lubricant pocket 33 so that there is always provided a lubricant supply between the left roller 23 and the left bearing surface 32.

In a like manner, the right roller, also rotating in a counterclockwise direction, forms a lubricant pocket 38 between it and the right bearing surface 32 so as to always provide for lubricant between the right roller 23 and the right bearing surface 32. There will, of course, be lubricant flow between the right roller 23 and the right bearing surface 32 into the right lubricant pocket 33 so that there will be a constant supply of lubricant for flow between the right roller 23 and the right bearing surface 31.

By forming the bearing surfaces 31, 32 of a convex configuration, it will be seen that the rollers 23 rolling thereagainst will roll as though they are rolling against adjacent fixed rollers and thus not only is there provided a good rolling contact, but also a good supply of lubricant between the rolling contacting surfaces.

In order that the bars 26 may be secured to the side rings 25, each side ring is provided for each bar with a thru hole 40 and radially inwardly and outwardly of the hole 40 with recesses 41, 42, the recesses 41, 42 being formed by a punching operation so that like projections are formed on the outer surfaces of the side rings 25. Each end of the bar 26 is provided with a stepped projection which includes a first part 43 having flat sides and arcuate inner and outer surfaces 44, 45 of a common radius. The diameter of the surfaces 44, 45 is less than the length of the flats 34. The holes 40 correspond in cross section to the extension 43.

Disposed radially inwardly and outwardly of the first part 43 are inner and outer parts 46, 47 which also include inner and outer arcuate surfaces 48, 50 of a common radius with the arcuate surfaces terminating at each end thereof in an intersection with the respective one of the bearing surfaces 31, 32. It is to be understood that the projections 46, 47 correspond in cross section to the recesses 41, 42, respectively. It will be readily apparent that the interlocking of the second parts 46, 47 in the recesses 41, 42 provide for a much stronger mechanical interlock between the bars 26 and the side rings 25 than has been heretobefore possible.

Reference is now made to FIGS. 4–7 wherein a modified form of segmented retainer, generally identified by the numeral 51 is illustrated. The retainer 51, like the retainer 24, includes a pair of end or side rings 52, only one is shown, and a plurality of circumferentially spaced separator bars 53. As best shown in FIG. 7, each bar 53 includes enlarged inner and outer parts 54, 55 joined by a narrow cross section central part 56. At each side of the bar 53 there is a convex inner bearing surface 57, a convex outer bearing surface 58 and a flat 60 joining the surfaces 57, 58. Adjacent rollers 23 engage the bearing surfaces 57, 58 radially inwardly and outwardly, respectively, of the flats 60 and define together with the bar on opposite sides of the bar lubricant pockets 61 in the manner described with respect to the bearings 20. It is to be understood that the radius of each of the convex bearing surfaces 57, 58 is at least as great as the diameter of the associated roller 23 and preferably much greater.

It is to be understood that the bars 53 function with respect to the rollers 23 in the same general manner as that described with respect to the bars 26. However, the connections between the bars 53 and the side rings 52 is somewhat different. Each end of each bar 53 is provided with a stepped projection which includes a first part 62 in the form of a continuation of the central part 56, the first part 62 having the opposite sides thereof defined by the flats 60 and including inner and outer convex surfaces 63, 64 of a common radius with the surfaces 63, 64 having the side edges thereof intersecting the sides of the bar 53 along the lines of intersections between the bearing surfaces 57, 58 and the flats 60.

The side ring 52 is provided with a thru hole 65 of a cross section corresponding to the cross section of the part 62 so as to provide for a first mechanical interlock between each bar 53 and its associated side rings 52.

The stepped projection at each end of each bar 53 also includes second parts 66, 67 which are disposed inwardly and outwardly, respectively of the part 62. The part 66, 67 are part annular and each includes a remote convex surface 68 of a like radius which is materially greater than the radius of the surfaces 63, 64. Each side ring 52 has stamped in the inner surface thereof immediately adjacent each hole 65 inner and outer part annular recesses 70, 71 of a size to interlockingly receive the parts 66, 67, respectively. In the stamping of the recesses 70, 71 in the inner surfaces of the side rings 52, like projections 72, 73 are formed on the outer surface of each side ring 52.

Referring now to FIG. 8, it will be seen that there is illustrated another form of separator bar, generally identified by the numeral 72. The bar 72 is of a construction similar to the bar 53 and differs therefrom primarily in that it has a central part 73 which instead of the flats 60 of the central part 56, the central part has convex sides 74 of a like radius. Further, the first part of the stepped projection is circular in cross section and includes inner and outer convex surfaces 75, 76 which are of a like radius and are of the same radius as the sides 74.

The projection at each end of the bar 72 also includes part annular inner and outer parts 77, 78 which correspond to the parts 66, 67, respectively, of the bar 53.

It is to be understood that the side rings (not shown) associated with the bar 72 will have thru holes of a circular cross section and otherwise will be of the same configuration as the side rings 52.

Referring now to FIGS. 9 and 10, it will be seen that there is illustrated a segmented retainer, generally identified by the numeral 80 which includes bars 81 and end or side rings 82. The cross section of the bars 81 will be the same as that of the bar 53. Further, at each end of each bar 81 there is provided a projection 83 which corresponds to the part 62 of the bar 53. A thru hole 84 corresponding to the thru hole 65 of side ring 52 is formed in each side ring 82 for each bar 81.

The bar 81 differs from the bar 53 in that it does not have the second projecting parts 66, 67 formed thereon. In lieu thereof, the end face at each end of the bar 81 is provided adjacent its radially inner and outer surfaces with a recess 85. The side ring 82 is provided with a complementary projection 86 for each recess 85. The projections 86 are formed by a punching operation with the projections 86 being formed on the inner surface of the side ring 82 and like recesses 87 being formed in the outer surfaces of the side rings. It will be readily apparent that the interlocks between the bars 81 and the side rings 82 adjacently radially inner and outer surfaces of the bars 81 greatly strengthen the interlocking connections between the bars and side rings and prevent rotation of the bars relative to the side rings.

Figure 12:
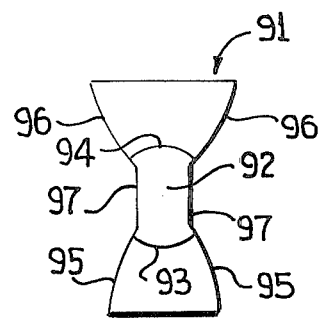
FIG. 12 is an end view of a separator bar particularly adapted for use with the side ring of FIG. 11.

Referring now to FIGS. 11 and 12, it will be seen that there is illustrated components of still another form of segmented retainer including a side or end ring 90 and a separator bar 91. The separator bar 91 will be of the same general configuration as the separator bar 53, but will have a single projection 92 at each end thereof. The projection 92 is of a greater radial extent than the central part of the bar and is in part defined by convex radially inner and outer surfaces 93, 94 which have the edges thereof intersecting bearing surfaces 95, 96 respectively of the bar inwardly and outwardly of flats 97 formed thereon in the central part thereof. The projection 92 has each side thereof formed by a respective flat 97 and adjacent portions of the bearing surfaces 95, 96.

The side ring 90 is provided with a plurality of thru holes 98 (one only being shown) of a cross section matching the cross section of the extension 92. It will be readily apparent that the interlock between each bar 91 and its associated side rings 90 will be one which will prevent relative rotation of the bars 91 with respect to the side rings 90.

In lieu of having mechanical interlocks between the bars and side rings of the segmented retainers with the interlocks being of the projection and recess and opening type, it has also been determined that it is feasible to form the interlock between bars and side rings by welding. For example, it has been found that the bars may be directly connected to the side rings by electron beam welding or welding of the plasma type wherein there is a heating and direct bonding of the metal at the ends of the bars with the adjacent metal of the side rings. No illustration of these connections is required.

Figure 13:
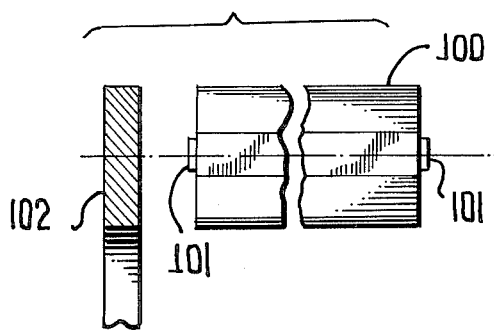
FIG. 13 is an exploded fragmentary elevational view with parts in section showing a side ring and separator bar construction particularly adapted for connection by welding.

It has also been found that satisfactory connection between separator bars and side rings of segmented retainers can be obtained by projection welding. With reference to FIG. 13, a separator bar 100, which may have the cross section of the bar 53, for example, is provided in the central part thereof at each end with a projection 101. Side rings, such as the plain end or side ring 102 are clamped against opposite ends of the bars 100, which have been positioned by means of a suitable jig (not shown) and pressure is applied to the side rings 102 simultaneously with the application of electrical energy to the side rings sufficient to effect melting of the projections 101 and the formation of spot welds over an enlarged area as defined by the edges of the projections 101.

Figure 14:
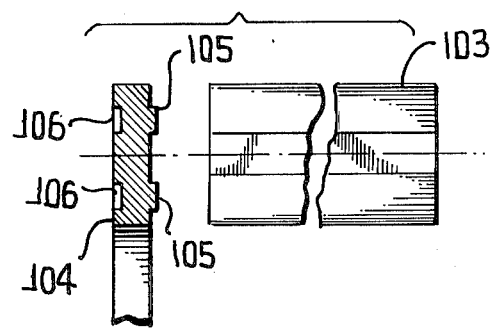
FIG. 14 is another exploded elevational view showing a modified form of welding connection between side ring and separator bar.

Referring now to FIG. 14, it will be seen that there is illustrated still another form of separator bar and side ring arrangement for welding, which arrangement includes a separator bar 103 which may be of the same cross section as the bar 53, for example, with planar ends, and end or side rings 104 of which only one is shown. For each bar 103, the side ring 104 has projecting from the inner surface thereof radially spaced welding projections 105. The projections 105 are formed by stamping with like recesses 106 being formed in the outer surface of the side ring 104.

Bars 103 and side rings 104 are assembled in the manner described with respect to the bars 100 and side rings 102 and welded together by the introduction of electrical energy. Inasmuch as the connection between each bar 103 and each associated side ring 104 includes two radially spaced welds, the connections provided between the bars 103 and the side rings 104 will have greater resistance to rotation than that between the bars 100 and the side rings 102.

Figure 16:
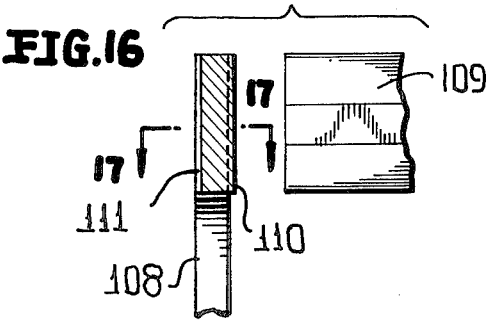
FIG. 16 is an exploded fragmentary elevational view similar to FIG. 13 and shows the construction of the components thereof adapting the same for welding.
Figure 15:
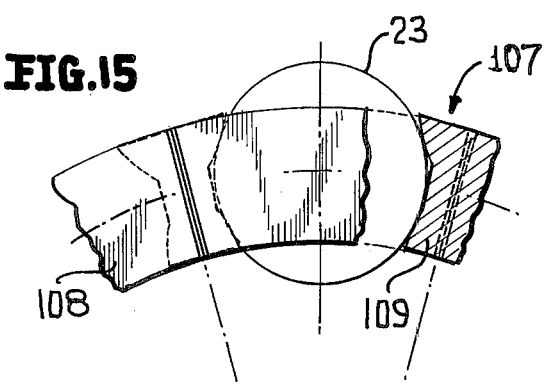
FIG. 15 is a fragmentary elevational view of portions of a roller bearing including a modified form of segmented retainer.
Figure 17:
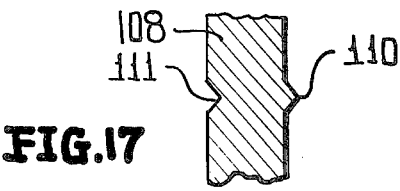
FIG. 17 is a fragmentary horizontal sectional view taken along the line 17—17 of FIG. 16 and shows more specifically the details of the side ring.

Reference is now made to the segmented retainer 107 of FIG. 15. The retainer 107 is formed of two end or side rings 108 having extending therebetween at circumferentially spaced intervals separator bars 109 which may be of the same configuration as the bars 53 and which have disposed therebetween rollers, such as the roller 23. The bars 109 are secure to the side rings 108 by projection welding. However, in this particular instance, as is best shown in FIGS. 16 and 17, a projection for each bar 109 is formed on each side ring 108 with the projection being a generally triangular cross sectional projection and extending radially of the side ring 108. The projection is identified by the numeral 110. Each projection 110 is formed by stamping with the result that the outer surface of each side ring 108 has a triangular recess 11 corresponding to the triangular cross sectional projection 110.

The bars 109 and side rings 108 are assembled in the same manner described above with respect to bars 100 and side rings 102 and are secured thereto by the application of electrical energy to the side rings 108 under pressure. Inasmuch as the weld extends the full radial extent of each separator bar 109, it will be seen that there is a very rigid connection between each bar 109 and the side rings 108 which greatly resist rotation of the bars 109.

It is to be understood that although numerous forms of segmented retainers and connections between separator bars and side rings thereof have been specifically illustrated and described herein, it is to be understood that the invention is not so limited to the described and illustrated retainers, but that minor variations may be made in the retainer construction without departing from the spirit and scope of the invention, as defined by apended claims.

What is claimed is:

1. A segmented retainer for a roller bearing, said retainer comprising a pair of end rings, a plurality of separator bars extending between said end rings, and means securing said bars to said end rings, each bar having at opposite sides thereof a set of inner and outer bearing surfaces for engagement by rollers, bearing surfaces of each set being spaced from each other to define a lubricant pocket therebetween, and each of said bearing surfaces being convex for cooperation with an associated roller for assuring a supply of lubricant between the roller and said surfaces.

2. The retainer of claim 1 wherein said securing means are electron beam welds.

3. The retainer of claim 1 wherein said securing means are projection welds.

4. The retainer of claim 1 wherein said securing means projection welds with the projections being formed on said bars.

5. The retainer of claim 1 wherein said securing means projection welds with the projections being stamped from said rings.

6. The retainer of claim 1 wherein said securing means are projection welds with there being at least two radially spaced separately formed points of weld between each bar and ring.

7. The retainer of claim 1 wherein said securing means projection welds with each projection being radially elongated.

8. The retainer of claim 1 wherein said securing means includes a projection on the end of each bar, and a complementary recess in a respective ring, each lubricant pocket is in part defined by a flat on said bar, and said projection includes a first part of a cross section defined along two sides by extensions of said flats and having inner and outer arcuate surfaces, and second parts disposed radially inwardly and outwardly of said first part.

9. The retainer of claim 8 wherein said second parts are recessed in said bar, and each ring has projections thereon received in said recess.

10. The retainer of claim 8 wherein said first and second parts are stepped.

11. The retainer of claim 8 wherein said first and second parts are stepped, and said rings have through openings receiving said first parts and recesses receiving said second parts.

12. The retainer of claim 8 wherein said first part two sides are of lesser radial extent than said flats.

13. The retainer of claim 11 wherein said first part two sides are of the same radial extent as said flats.

14. The retainer of claim 1 wherein said securing means includes a projection on the end of each bar and a complementary recess in a respective ring, and said projection includes a first part and second parts disposed radially inwardly and outwardly of said first part, said first part being of a circular cross section and said second parts being of part annular cross section.

15. The retainer of claim 1 wherein said securing means includes a projection on the end of each bar and a complementary recess in a respective ring, each lubricant pocket is in part defined by a flat on said bar, and said projection has sides each including an extension of a respective one of said flats and portions of said inner and outer bearing surfaces, and inner and outer arcuate surfaces of a common radius.

16. A segmented retainer for a roller bearing, said retainer comprising a pair of end rings, a plurality of separator bars extending between said end rings, and means securing said bars to said end rings, each bar having at opposite sides thereof a set of inner and outer bearing surfaces for engagement by rollers, the bearing surfaces of each set being spaced from each other to define a lubricant pocket therebetween, said securing means including a projection on the end of each bar and a complementary recess in a respective ring, each lubricant pocket being in part defined by a flat on said bar, and each projection including a first part of a cross section defined along two sides by extensions of said flats and having inner and outer arcuate surfaces, and second parts disposed radially inwardly and outwardly of said first part.

17. The retainer of claim 16 wherein said second parts are recessed in said bar, and each ring has projections thereon received in said recesses.

18. The retainer of claim 16 wherein said first and second parts are stepped portions of each projection.

19. The retainer of claim 16 wherein said first part two sides are of lesser radial extent than said flats.

20. The retainer of claim 16 wherein said first part two sides are of the same radial extent as said flats.

* * * * *